Aug. 30, 1927.

I. M. LADDON ET AL 1,640,573

REENFORCED WHEEL

Filed April 6, 1927

INVENTORS
ISSAC M. LADDON
WILLIAM A. RING
FRED W. HERMAN
BY:- *Jn. W. McConkey*
ATTORNEY Patented Aug. 30, 1927.

1,640,573

UNITED STATES PATENT OFFICE.

ISAAC M. LADDON, WILLIAM A. RING, AND FRED W. HERMAN, OF DAYTON, OHIO, ASSIGNORS TO BENDIX BRAKE COMPANY, OF CHICAGO, ILLINOIS, A CORPORATION OF ILLINOIS.

REENFORCED WHEEL.

Application filed April 6, 1927. Serial No. 181,352.

This invention relates to wheels and is illustrated as embodied in three different forms of metal wheels for use on heavy aeroplanes. An object of the invention is to provide a very light wheel, more particularly by adapting the construction for the use of duraluminum, while at the same time giving the wheel maximum strength, both against compression and against lateral strains or "side thrusts".

Preferably the invention is embodied in a wheel of the type in which a hub and a rim or equivalent outer annular member are connected by a pair of spaced disks, and the desired strength against side thrust is secured by utilizing a conical reenforcing disk secured with the inner edge of one of the wheel disks to one end of the hub and having its outer edge secured to the rim on the opposite side of the central plane of the wheel. Ordinarily, we consider it desirable to use a drop-center rim with a wheel of this type, and in this case the outer edge of the conical reenforcing disk is secured to the side of the drop-center portion of the rim.

Figure 1:
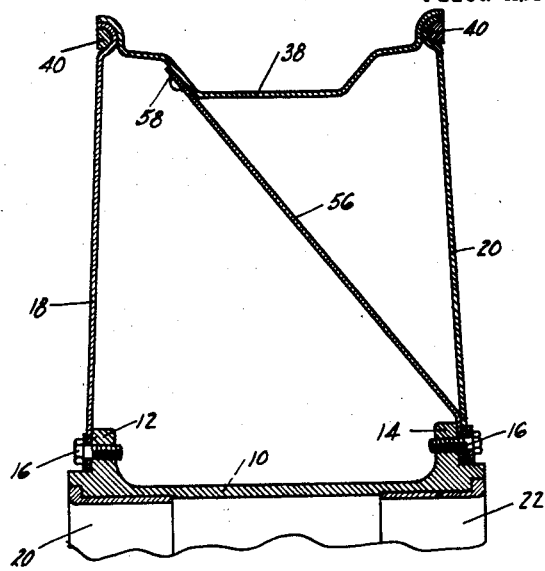
Figure 2:
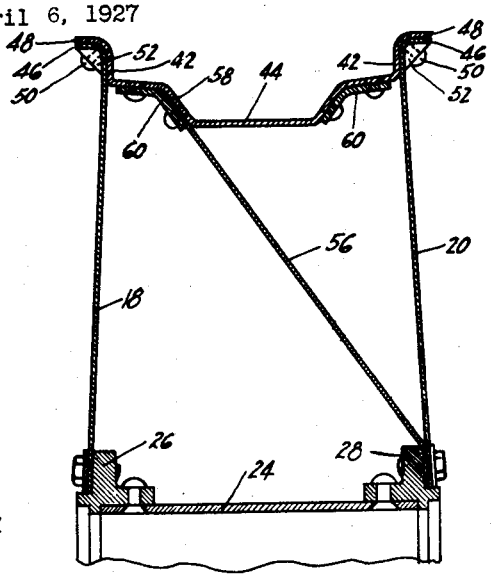
Figure 3:
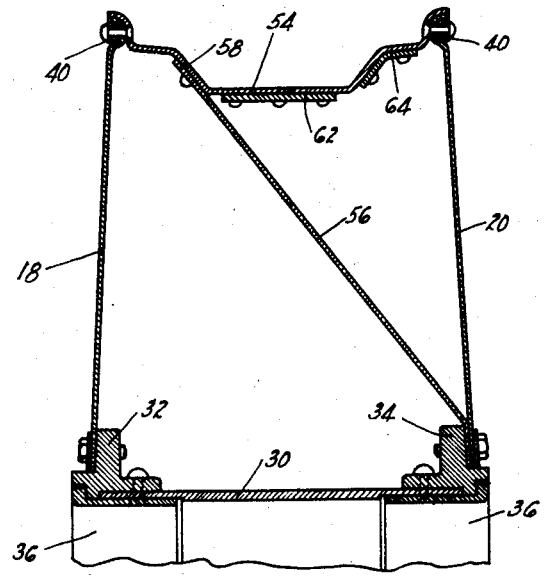

The above and other objects and features of the invention, including various novel and desirable particular constructions, will be apparent from the following description of three illustrative embodiments shown in the accompanying drawing, in which:

Figures 1, 2, and 3 are partial radial sections through three different forms of wheels, each of which embodies our invention.

Each of the three wheels embodies a central hub formed of duraluminum, that in Figure 1 including a tubular casting 10 having flanges 12 and 14 at its ends, to which cap screws or other fastenings 16 secure the inner edges of the wheel disks 18 and 20. Sleeves 22 are pressed into opposite ends of the casting 10 to receive the wheel bearings. The hub in Figure 2 includes a section of duraluminum tubing 24 to opposite ends of which are riveted or otherwise secured castings 26 and 28 formed with the flanges to which the wheel disks 18 and 20 are secured. The hub in Figure 3 includes a similar section 30 of tubing and generally similar castings 32 and 34 formed with flanges for the attachment of the wheel disks 18 and 20, but has in addition two sleeves 36 pressed into its opposite ends to receive the wheel bearings.

The outer part of the wheel is in the form of a tire rim, preferably a drop-center rim, which we prefer to roll from a strip of duraluminum. In Figure 1 the rim 38 at its opposite sides, together with the outer edge portions of the wheel disks 18 and 20, is rolled over the reenforcing rings 40, to which the disks and the sides of the rim may be riveted or otherwise secured if desired. In Figure 2 the outer edge portions of the wheel disks 18 and 20 are arranged in engagement with straight sides 42 of a rim 44, and are spun or otherwise formed with edge flanges 46 underlying and engaging edge flanges 48 on the rim. The disks may be secured to the rim by rivets or other fastenings 50 passing through blocks 52 arranged in the angles formed between the disks 18 and 20 and the flanges 46. The disks 18 and 20 are secured to the rim 54 in Figure 3 substantially as in Figure 1.

As shown in Figure 1, the wheel is braced against side thrusts by a novel conical reenforcing disk 56 riveted or otherwise secured to one side 58 of the drop-center portion of the rim 38 at its outer edge. The inner edge of the reenforcing disk 56 is secured to the flange 14 underneath the inner edge of the wheel disk 20. The construction in Figure 2 differs from that just described only in that plates 60 are provided on opposite sides of the drop-center portion of the rim and connected and underlap the adjacent ends of the rolled strip which makes up the rim. It will be seen that one of the members 60 serves as additional means for attaching the outer edge of the reenforcing disk 56 to the side 58 of the drop-center portion of the rim. In Figure 3, the reenforcing disk 56 is considered sufficient for securing together the adjacent ends of the rolled strip forming the rim at the side 58 of the drop-center portion, and members 62 and 64 are arranged to underlap and be riveted to said ends at the opposite side of the drop-center portion, and beneath the bottom of the drop-center portion of the rim. In the case of Figure 3, the reenforcing rings 40 also serve to fasten the ends of the rolled strip together to form the rim 54.

While three illustrative embodiments of the invention have been described in detail, it is not our intention to limit its scope to those particular embodiments or otherwise than by the terms of the appended claims.

We claim:

1. A wheel comprising, in combination, an outer rim, a hub, a pair of spaced disks connecting the rim and hub, and a conical reenforcing disk secured with the inner edge of one of the spaced disks to the hub and having its outer edge secured to the rim.

2. A wheel comprising, in combination, an outer rim having a drop center, a hub, a pair of spaced disks connecting the rim and hub, and a conical reenforcing disk secured with the inner edge of one of the spaced disks to the hub and having its outer edge secured to one side of the drop-center portion of the rim.

In testimony whereof, we have hereunto signed our names.

ISAAC M. LADDON.
WILLIAM A. RING.
FRED W. HERMAN.